United States Patent [19]

Stary

[11] Patent Number: 5,160,118
[45] Date of Patent: Nov. 3, 1992

[54] PIPELINE VALVE APPARATUS

[76] Inventor: Gary M. Stary, 636 Thorn Hollow Dr., Coraopolis, Pa. 15108

[21] Appl. No.: 809,720

[22] Filed: Dec. 17, 1991

[51] Int. Cl.$^5$ .............................................. F16K 1/22
[52] U.S. Cl. ...................................... 251/173; 251/305
[58] Field of Search ................ 251/173, 305, 306, 314

[56] References Cited

U.S. PATENT DOCUMENTS

| 2,081,842 | 5/1937 | Sharp | 251/173 |
| 2,883,149 | 4/1959 | Fiorentini | 251/306 |
| 3,357,680 | 12/1967 | Williams | 251/305 |
| 4,133,513 | 1/1979 | Meyer | 251/306 |

FOREIGN PATENT DOCUMENTS 2846439  5/1979  Fed. Rep. of Germany ...... 251/306

Primary Examiner—John C. Fox
Attorney, Agent, or Firm—Kirkpatrick & Lockhart

[57] ABSTRACT

A pipeline valve is provided which includes a valve body having a spherical bore with a cylindrical valve seat. The cylindrical valve seat is positioned along the centerline of the spherical valve body and can be machined in the valve body. Alternatively, the valve seat can be an elastomeric material which is inserted into the valve body. The butterfly valve disk is conical in shape. In one embodiment, the disk is constructed from two halves, fastened together, having a movable T-seal perimetrial surface. The T-seal is received by a groove recessed within the disk. Behind the T-seal, an elastomer or linear expander biasing member can be disposed to force the T-seal in a direction towards the valve seat. The valve disk is connected to a control shaft by an attachment assembly which allows for self-alignment of the disk. The control shaft terminates in a forked end having two legs which define an aperture corresponding to coupling pads on either side of the disk. The disk includes a tongue disposed across the top of the disk. The control shaft has a corresponding groove adapted to receive the tongue on the disk. Surrounding the shaft is a stuffing box containing packing rings. The packing rings prevent the pressure medium from escaping between the shaft and the valve body to atmosphere. The shaft has grooves therein which receive the packing rings. The packing rings are forced into the grooves, thereby effectively sealing the valve body.

9 Claims, 14 Drawing Sheets

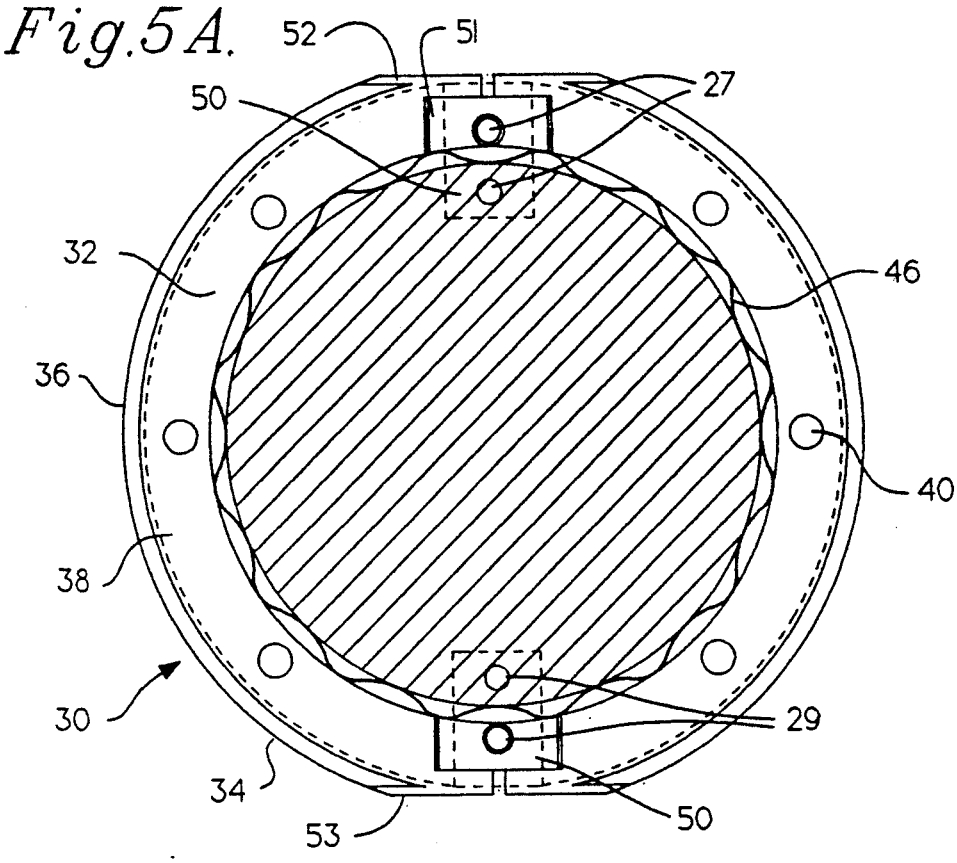
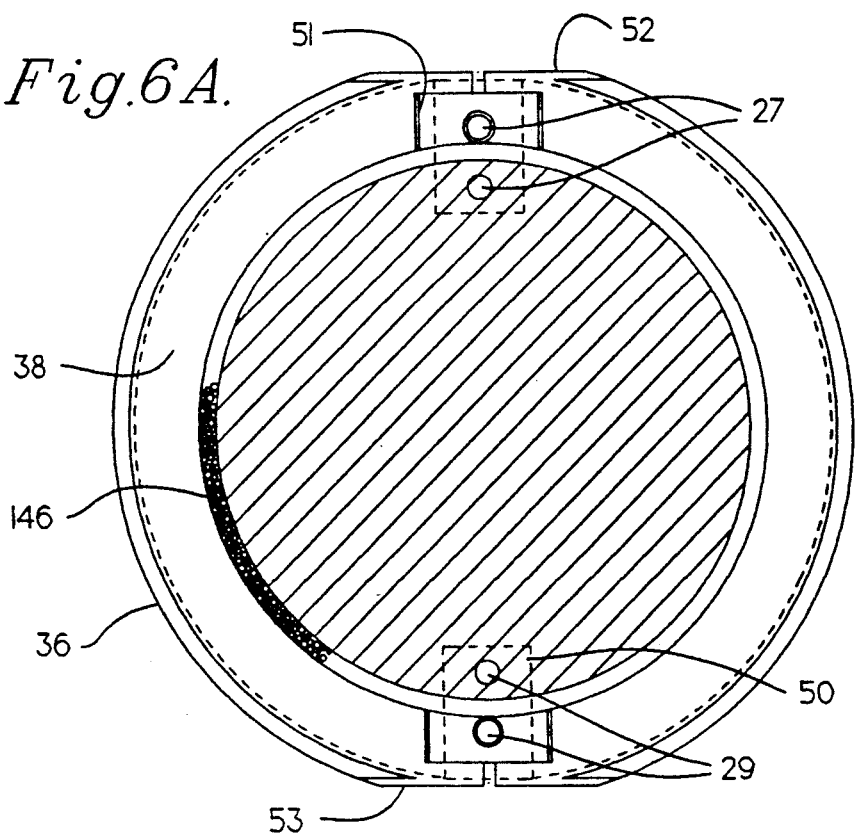

PIPELINE VALVE APPARATUS

BACKGROUND OF THE INVENTION

1. Field of the Invention

The present invention relates to a pipeline valve apparatus and, more particularly, to improvements in sealing and flow characteristics of valves.

2. Description of the Invention Background

Heretofore, valve bodies have been constructed in various forms, two of which include spherical bore valve bodies which were adapted to receive ball valves and cylindrical bore valve bodies which were adapted to receive butterfly valves. There are several disadvantages associated with these valve forms. The spherical bore valve body with a ball valve, although providing satisfactory sealing characteristics provides poor throttling characteristics. While such valves may be adequate when only fully open and fully closed valve positions are required, when throttling is required, cylindrical bore valve bodies with butterfly valves are preferred.

However there are problems associated with cylindrical bore valve bodies, one of which is that the butterfly valve must have a smaller diameter than the bore of the body. In the event of catastrophic failure of the shaft which rotates the valve, the valve may travel downstream, posing a risk to workers and equipment. Another problem with prior butterfly valves is that they are rotated by means of a shaft which is inserted into the disk. Such valves require hubs built into the disk to receive the shaft. Thus, it is necessary to provide a disk with a hub area having a greater diameter than the shaft. The enlarged hub areas, especially in the smaller valves, such as valves in the 4 inch and smaller pipeline range, produce a significant flow restriction through the pipe even when disk is rotated to the full open position. Additionally, due to the cylindrical bore in the valve body, flow is limited through the valve body because of the minimal relative distance between the disk and the inside surface of the valve body. Such severe flow restrictions associated with butterfly valves having cylindrical bore valve bodies render such valves undesirable in many applications.

Therefore, control valves especially in the 4 inch and smaller pipeline range need the desirable characteristics of both butterfly valves and ball valves but which eliminate the undesirable characteristics of such valves. A valve is needed which has increased flow through the valve body when fully open and which has excellent throttling characteristics. A valve is also needed which will not travel downstream should catastrophic shaft failure occur.

The demand for control valves to perform in very hostile chemical environments has caused valve manufacturers to produce a variety of very different butterfly and ball valve product lines within each company. Unfortunately, each product line requires its own engineered and manufactured components, a situation producing significant cost increase at both the manufacturing and customer levels.

Manufacturability poses another problem in many valve designs, and the ball and butterfly valves are no exception. The disk's concentricity to the valve housing seat requires very rigid design standards and expensive machine tooling. A valve body or disk machined out of tolerance produces higher cost in scraped components, and/or valves in service with components at borderline tolerances will inevitably generate higher maintenance costs.

Another problem with valves used in the past is that it is difficult to obtain an effective seal between the valve body and the control shaft. Valves in the past utilized stuffing boxes with packing rings which had to be forced against the smooth surface of the control shaft to effectuate a proper seal. Relatively high forces were required to maintain such a seal between the packing rings and the smooth surface of the control shaft.

Additionally, it is desirable to provide a valve which eliminates fugitive emissions of any chemical identified as hazardous. Therefore, a valve design is needed that will minimize the present shaft high friction forces, while allowing safe and reliable performance within acceptable fugitive emissions limits.

The present invention is directed toward an improved design for a valve apparatus which overcomes, among others, the above discussed problems.

BRIEF SUMMARY OF THE INVENTION

The present invention provides a valve which overcomes many of the deficiencies of valves in the past. A butterfly valve is provided which includes a valve body having a spherical bore with a cylindrical valve seat. The cylindrical valve seat is positioned along the centerline of the spherical bore valve body and can be machined in the valve body or can be a rigid insert such as polytetrafluoroethylene reinforced fiberglass. Alternatively, the valve seat can be an elastomeric material, such as rubber or polytetrafluoroethylene, which is inserted into the valve body. Such an elastomeric valve seat is suitable for positive shut-off at temperatures under 500° F. The valve body can be of unitary construction or can be comprised of two separate sections, an outer section and an inner section. The two section design allows for the option of constructing the two pieces of different materials. The valve body is symmetrical with respect to its transverse axis thus allowing actuation from either end.

The valve disk will consist of three variable shapes and a perimetrical surface with design interchangeability in material and construction techniques that will increase the valve's overall service capabilities in a wide variety of commercial and high technology applications. In one embodiment, the disk is constructed of metal or a high strength polymer and is formed as a unitary member with a convex perimetrical surface. Alternatively, the larger disks can be constructed as two halves, secured together with a plurality of fasteners or pins and plug welds, preferably with a minimum of seven. This concept will help keep manufacturing costs at a minimum, since the casting pattern will be simplified and the same pattern will be used to cast both halves. The disk's replaceable T-Seal will be available as a elastomer, polytetrafluoroethylene or metal peripheral component. The T-seal is constructed as two halves and each half includes two portions, a sealing portion and an attachment portion, which are perpendicular to one another.

The attachment portion of the T-seal is received by a groove recessed within the disk. Behind the attachment portion, a elastomer or linear expander biasing member can be disposed to force the T-seal in a direction toward the valve seat. The T-seal is received by the disk in such a manner so as to allow for movement of the T-seal toward and away from the center of the disk. Thus, the movement of the T-seal allows the disk to move into the sealing position without causing excessive wear on the elastomeric valve seat because the T-seal will move toward the disk when the disk is moving toward the valve seat. When the valve disk has moved into the fully closed position, the biasing member forces the T-seal toward the valve seat thus providing an effective seal. Therefore, the problems associated with butterfly valves in the past relating to inadequate sealing are overcome by the addition of the T-seal. Additionally, since the bore is spherical, if catastrophic shaft failure should occur, the disk cannot completely pass through the spherical bore, and thus is prevented from traveling downstream. Also, the cylindrical centerline valve seat provides for low seating and break away torque.

The valve is connected to a control shaft by a unique attachment assembly. The control shaft terminates in a forked end having two legs. The inner surfaces of the legs define an aperture which corresponds to coupling pads on either side of the disk. The legs can be attached to the disk by conventional means such as bolts, screws or rivets with the holes in the disk for receiving the bolts, screws or rivets being slightly oversized. The over-sized fastener holes in the disk coupling pads and the difference between coupling pads width, allow the disk to move right to left and vise versa. The upper and lower disk tongues are assembled into a series of components with a mating groove. The tongue and groove feature will also allow the disk the freedom to move right to left and vise versa. The disk's entry into the center-line seat orchestrates all the self-alignment features to come into play allowing perfect concentricity to the disk's periphery and centerline seat.

An important feature of the invention is the means by which the disk is held to the shaft and attachment assembly. The disk includes a tongue disposed across the top of the disk. The control shaft has a corresponding groove adapted to receive the tongue on the disk. Surrounding the shaft is a flanged bushing adapted to rotatably receive the shaft. The flanged bushing also has a groove adapted to receive the tongue on the disk. Surrounding the flanged bushing is a spherical rotating seal which also has a groove for receiving the tongue on the disk. The spherical rotating seal serves as a sealing component and its responsibility is more important in the positive shut-off design. The spherical area acts as a continuation of the disk's periphery seal as it moves into the center-line seat area. Another added sealing feature will be found in the elastomeric seals. The top of the seal exposes a large surface area to the system pressure. In the case of the threaded portable stuffing box, the flanged bushing is assembled through the spherical rotating seal and into bearing bore in forward section of the portable stuffing box. In the case of the O-ring portable stuffing box, the flanged bushing is assembled through the spherical rotating seal and into the bearing bore in the shaft bore.

This unique attachment assembly by which the disk is connected to the power and slave shafts through a series of overlapping components, associated with a tongue and groove concept have significantly increased the pressure containing capability of a dual shaft design. In addition, the design represents an improvement in the strength of butterfly valves. Since the flange bushing is positioned on the outside of the shaft and overlaps the shear stress points, it can be viewed as an added dimension to the valve's overall strength capabilities. The flange bushing can provide 15 to 20% added strength factors not found in butterfly valves of the past. This feature not only is significant from a safety standpoint but it can reduce costs by eliminating the need to increase the shaft's size.

The shaft section between the valve body and disk are subject to extremely high shear and bearing load factors. The flanged bushing maintains a dual responsibility in this area. It functions as the shaft's thrust load pivoting point, while acting as an overlapping component between the disk and valve body increasing the valve's overall pressure containing capability. The tongue and groove design, whereby the disk's tongue, when assembled into its mating shaft and spherical rotating seal, further increases the valve's overall yield strength. All the above components when assembled into the spherical bore body, provide a valve with pressure containing capabilities superior to control valves of the past.

The disk self-alignment feature is another characteristic unique to this design. When the disk is in its final closing position, the shaft allows for movement of the disk by slight amounts in a direction parallel to the groove in the rotating seal and thus allows the disk to self-align within the valve body. Further, since the valve member is disk shaped, the bore is spherical and the valve disk does not require an enlarged hub area, the valve has throttling and minimal flow restriction characteristics which are better than butterfly valves of the past.

Another important feature of this invention is the manner in which the valve body is sealed off from atmosphere. In one embodiment of the valve body, surrounding the shaft and adapted to receive the flanged bushing is a threaded, portable stuffing box containing packing rings. The stuffing box and packing rings prevent the pressure medium from escaping between the shaft and the valve body to atmosphere. The shaft has grooves therein which receive the packing rings. The packing rings are forced into the grooves, thereby effectively sealing the valve body. The packing ring material being forced into the shaft's radius grooves produce a retaining affect preventing vertical movement during high pressure surges. The system pressure exerts an outward force, pushing the packing ring material tight against the upper groove radius producing a positive seal. The higher the system pressure the tighter the packing material seals in the radius grooves. The stuffing box is threaded into the valve body and surrounds the flanged bushing. The threaded, portable stuffing box is desirable for use in high temperature/pressure applications due to its excellent sealing characteristics.

The following description is intended to put into perspective the performance and maintenance advantages of the threaded, portable stuffing box and its power shafts with grooved seal system, versus one of the most common and widely used shaft seal systems of the past.

Contrary to many previous designed shaft seal systems, more packing rings will not produce a more effective and reliable seal system. The following explanation and example will support this allegation. The first packing ring in a stack series stuffing box will absorb 50% of the total pressure drop, and each ring thereafter will absorb 50% of the previous ring. Accordingly, the first five packing rings retain 97% of the total pressure drop. The last five packing rings have little affect on seal performance but will produce a negative impact in both the packing ring friction, thus producing high operating torques and added cost due to specialized castings and in-line deep drilling of stuffing box chamber.

Most seal systems of the past require a very high thrust force being exerted against the packing rings squeezing tight against the rotary shaft and stuffing box wall. This high thrust force in conjunction with temperatures and chemicals can cause packing rings to become hard and in some cases crystallize, producing seal failure.

The threaded, portable stuffing box with the shaft having grooved seal system requires significantly less thrust force while achieving the same sealing capabilities of past control valves. The threads were developed for components associated with high pressure hydraulic equipment and are known in that industry as NPTF. This thread design enables a component to be disassembled and assembled many times while maintaining a leak-free high pressure connection.

The male end of my NPTF portable stuffing box maintains a 1" 11½ NPT ¾" standard pipe thread taper. The opposite end, sometimes referred to as the female end, maintains a 1" 11½ NPTF ⅞" pipe thread taper. The high pressure seal is developed through a deliberated difference of taper between the male fitting end (NPT) and tapped female fitting end (NPTF). Both fitting ends are machined to ring gage tolerances, allowing the two components to seal at a predetermined dimension. This gaged tolerance insures only the necessary packing ring thrust force is generated insuring the packing rings are squeezed properly into the shafts ringed grooves. The gaged tolerance also prevents over thrusting the packing rings, while providing a high pressure, leak-free connection at the components mating threads.

My standard NPTF portable stuffing box houses five packing rings. The packing rings are die mold ¼" square angle cut, available in grafoil ribbon and polytetrafluoroethylene rope. These two materials cover the majority of service applications and are readily available throughout the packing industry.

A standard power shaft consists of several radius ringed grooves. Although there are five packing rings, they are squeezed into the several individual radius rings in the power shaft producing several individual sealing points. Each individual radius ring acts as a retaining groove lock packing ring, preventing up-/down movement during pressure surges. When the piping system pressure increases, it exerts an outward force against the first packing ring. Since the first ring has been squeezed into the first two radius rings, the system pressure caused the packing ring material in the top radius of the two grooves to squeeze the packing material very tight against the two upper radius, the higher the system pressure, the greater the seal force on the two radius grooves and preventing media leakage past the first packing ring.

As stated above, regarding shaft seal systems of the past, the first packing ring will absorb 50% of the total line pressure, all rings in series thereafter will absorb 50% of the previous ring. These finds reveal that once the system media leaks past the first packing ring, shortly thereafter it will leak past all subsequent rings and into the surrounding environment.

Unlike the aforementioned seal system, my NPTF portable stuffing box, with the power shaft's radius grooves perform as individual sealing chambers, preventing premature shaft seal failure.

My NPTF portable stuffing box incorporates a unique tier stack concept. This design will have significant impact in the reduction of special ordered castings, the expensive machining of valve body deep stuffing box, while improving manufacturing lead-time.

Maintenance personnel can install new packing system in minutes versus hours it may take to service a shaft seal system of the past. The portable stuffing box will be shelf stock as a pre-assembled packing ring component. Replacement will find maintenance personnel un-threading the old stuffing box and installing the pre-packed stuffing box.

The process control industry creates a vast array of very hostile processes to control. The specialty valve industry will find this invention of significant importance, since its components and material interchangeability enable one valve design to control a broad spectrum of industries exotic processes. This invention further provide increased productivity through increased flow in the small port butterfly valve while keeping manufacturing, procurement and maintenance cost affordable.

DESCRIPTION OF THE DRAWINGS

In the accompanying drawings, I have shown a present preferred embodiment of the invention wherein:

FIG. 4A is a front view of one embodiment of the valve body of the present invention;

FIG. 4B is a cross-sectional side view of the valve body of FIG. 4A taken along the line BB—BB in FIG. 4A;

FIG. 6A is a cross-sectional view of another embodiment of the valve disk of the present invention;

DETAILED DESCRIPTION OF THE PREFERRED EMBODIMENTS

Figure 1A:
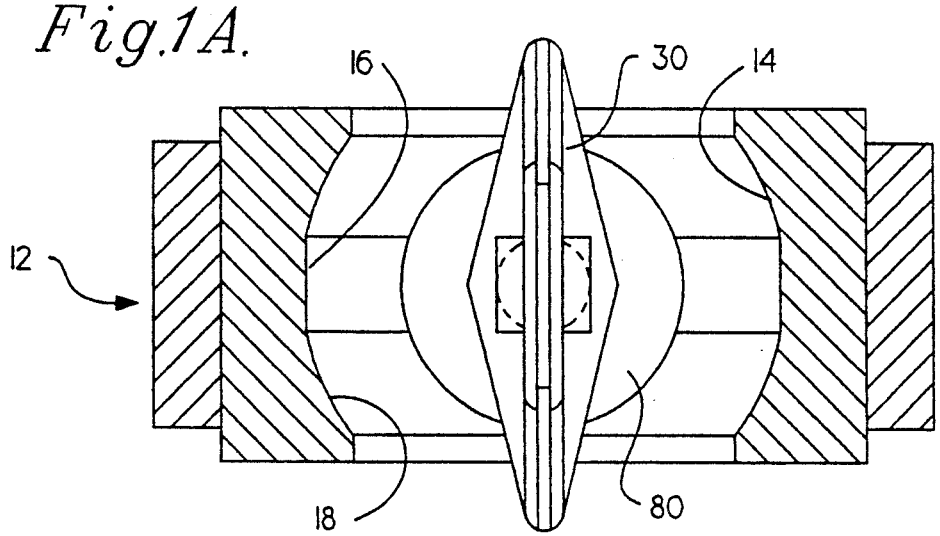
FIG. 1A illustrates one embodiment of the valve body and a double conical valve disk shown in partial cross-section with the valve disk in the fully open position.

Referring now to the drawings wherein the showings are for purposes of illustrating the preferred embodiments of the present invention only and not for purposes of limiting same, the Figures show a valve apparatus for use in controlling flow through a pipe.

Figure 1B:
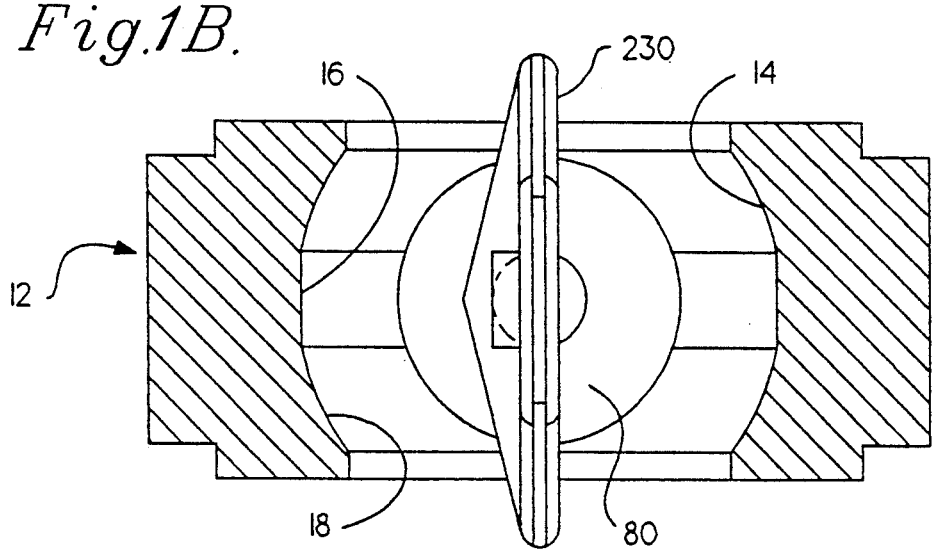
FIG. 1B illustrates one embodiment of the valve body and a single conical valve disk shown in partial cross-section with the valve disk in the fully open position.
Figure 1C:
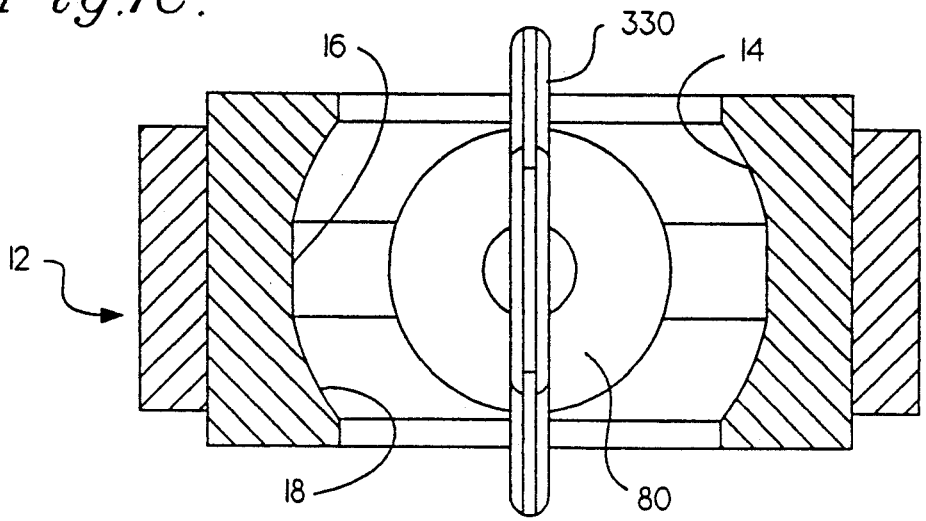
FIG. 1C illustrates one embodiment of the valve body and lean profile valve disk shown in partial cross-section with the valve disk in the fully open position.
Figure 1D:
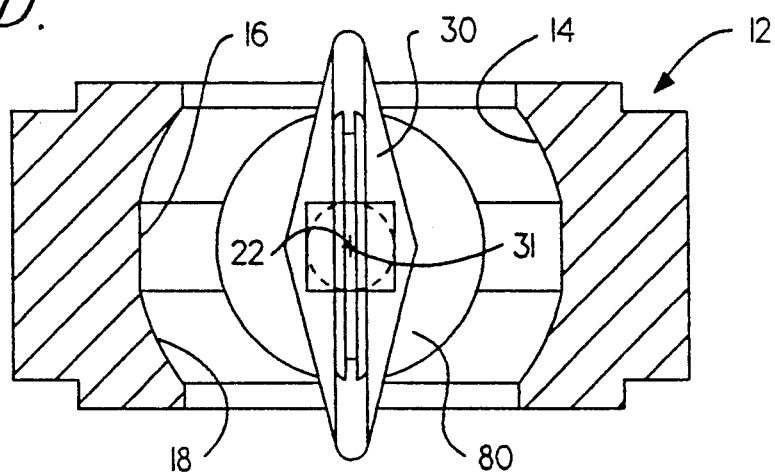
FIG. 1D illustrates one embodiment of the valve body and valve disk shown in partial cross-section with the valve disk in the fully open position.
Figure 1E:
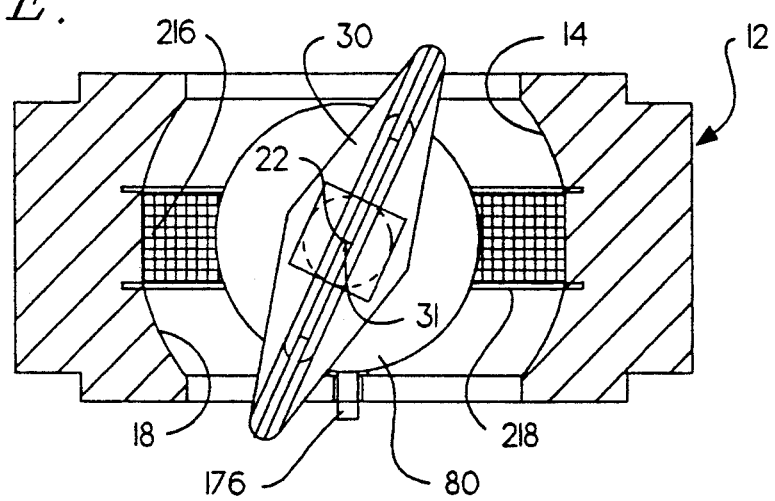
FIG. 1E illustrates one embodiment of the valve body and valve disk shown in partial cross-section with the valve disk in the partially open position.
Figure 1F:
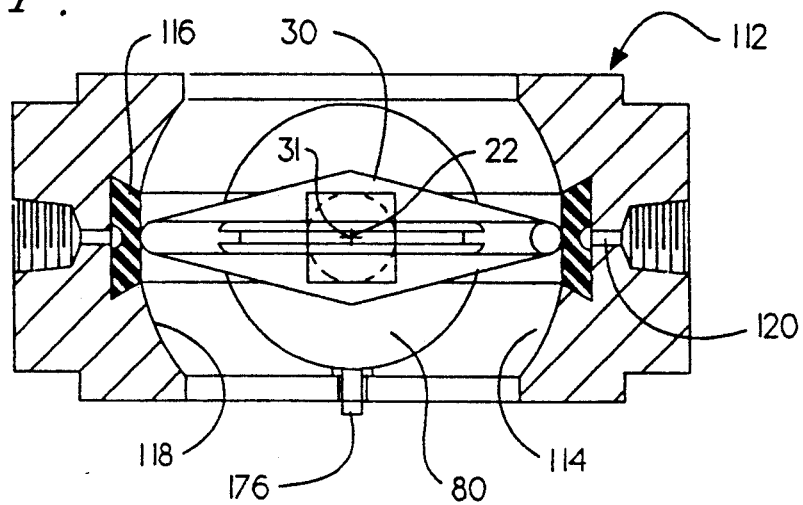
FIG. 1F illustrates one embodiment of the valve body and valve disk shown in partial cross-section with the valve disk in the fully closed position.

FIGS. 1A-1C illustrate three embodiments of the valve body and disk of the present invention. The valve body 12 is shown therein in conjunction with valve disk 30, 230 or 330, respectively. The valve body 12 has a spherical bore portion 14, which is truncated by two planes which are parallel and are equidistantly spaced on opposite sides of the center plane of the valve body, and a cylindrical bore valve seat 16. The bore of the valve body defines an inside surface 18. The valve body may be constructed from any suitable material such as (PVC) pressure vessel quality, carbon steel or 316 stainless, for example. The disk 30 is preferably shaped as a pair of cones having their bases adjacent one another. FIG. 1A illustrates a double conical disk 30 which is preferable where high strength is desirable. FIG. 1B illustrates a single conical disk 230 which has increased flow over the double conical disk 30. FIG. 1C illustrates the lean profile disk 330 which has maximum flow characteristics. FIG. 1D illustrates the valve disk 30 in the fully open position. FIG. 1E illustrates the valve disk 30 in the partially open or throttling position. FIG. 1F illustrates the valve disk in the fully closed position. As will be described hereinbelow, the unique construction of one embodiment of the valve disk utilizing a movable T-seal allows for radial contraction of the valve disk 30, thus making it possible for the valve disk 30 to move into the fully closed position where, due to the cylindrical bore valve seat 16, 116 or 216, the radial distance from the center 22 of the valve body 12 to the valve seat 16, 116 or 216 is slightly smaller than the radial distance from the center 22 to the remainder of the inside surface 18 of the valve body 12.

Figure 2A:
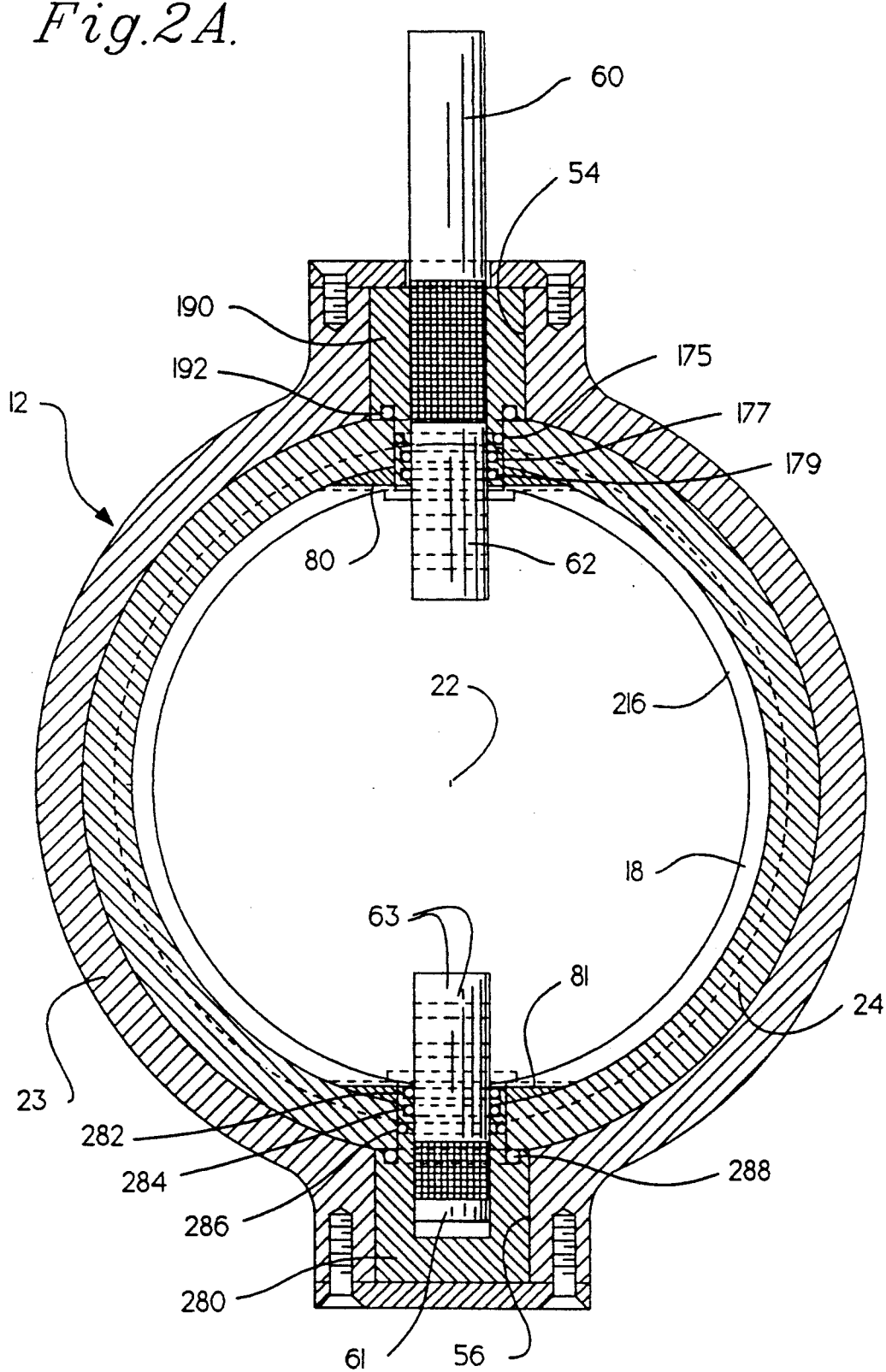
FIG. 2A is a cross-sectional front view of one embodiment of the valve body of the present invention.
Figure 2B:
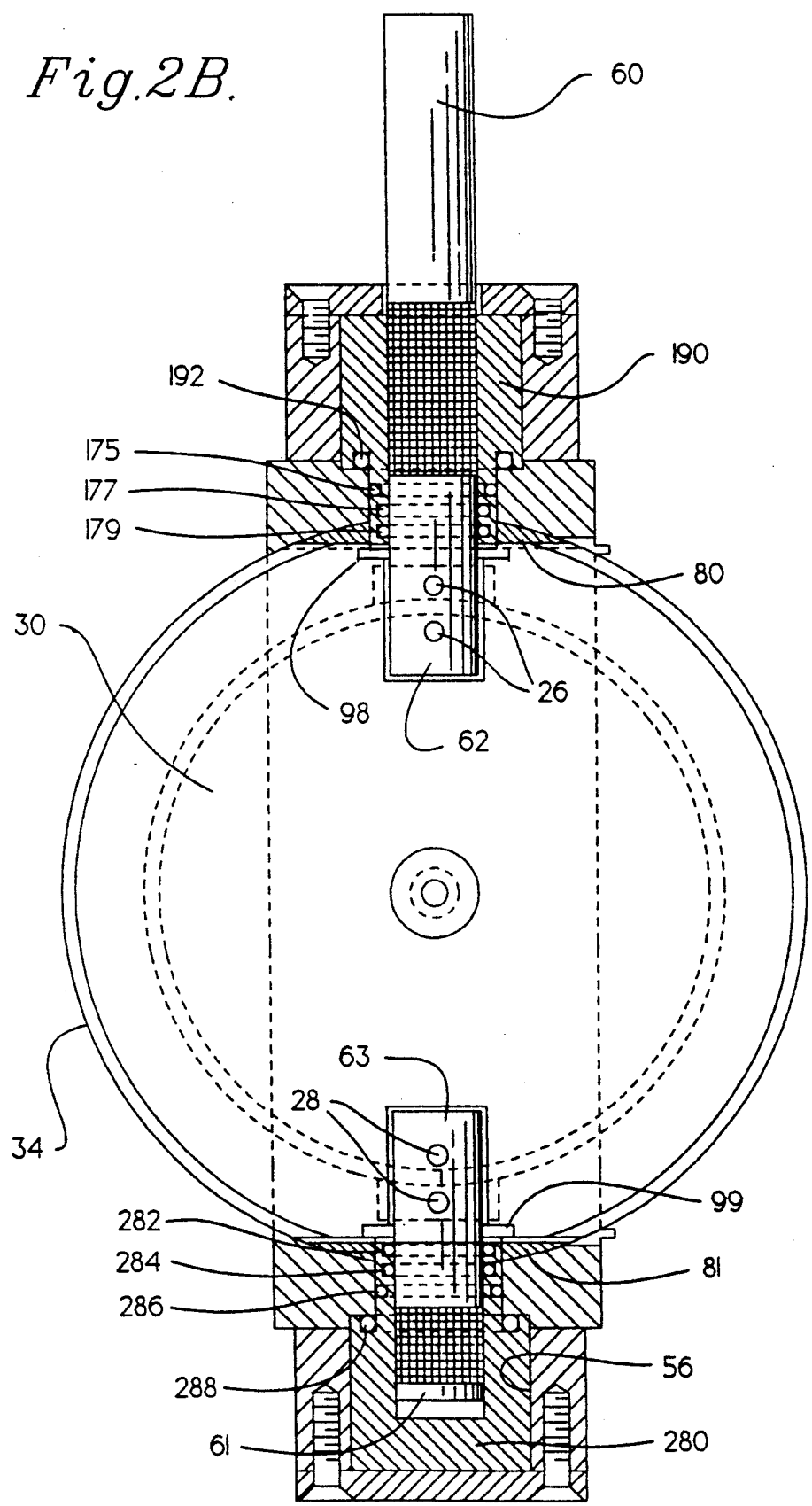
FIG. 2B is a cross-sectional side view of the valve body and valve disk of FIG. 2A.
Figure 2C:
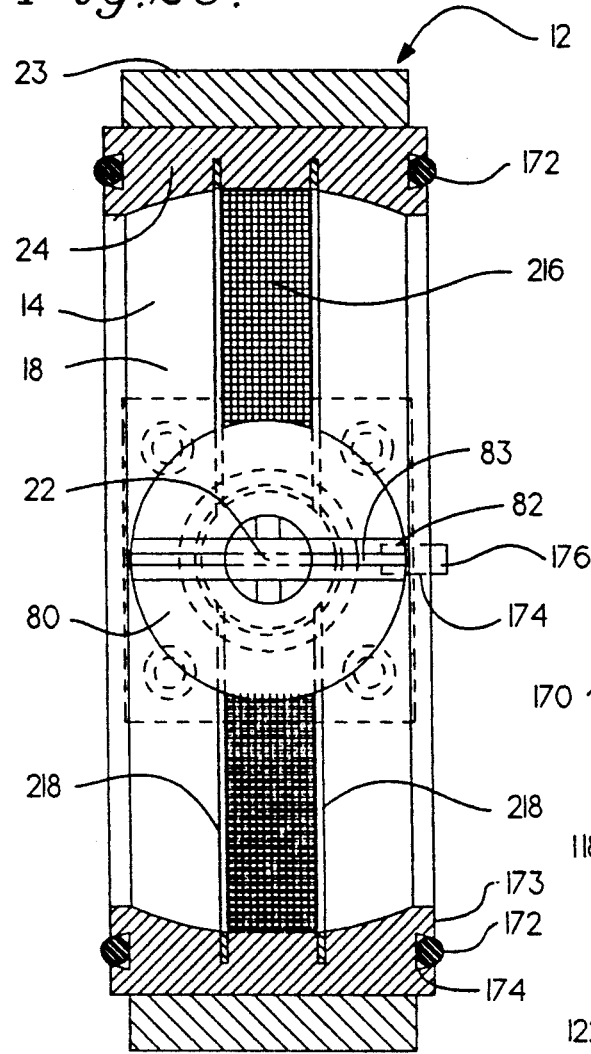
FIG. 2C is a cross-sectional top view of one embodiment of the valve body of the present invention.
Figure 3C:
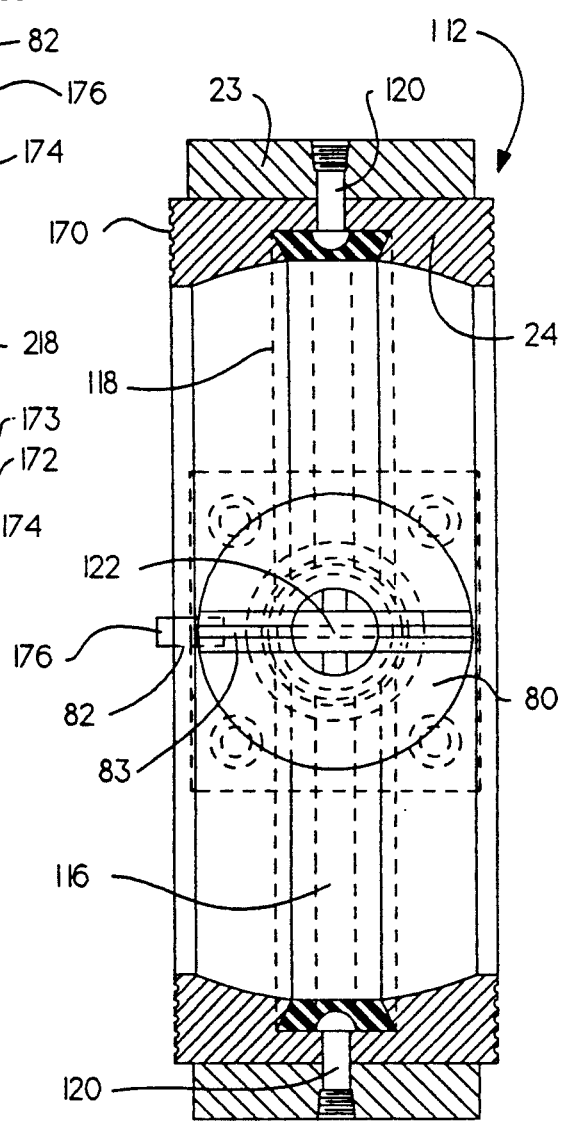
FIG. 3C is a cross-sectional top view of the valve body of FIG. 3A.
Figure 4C:
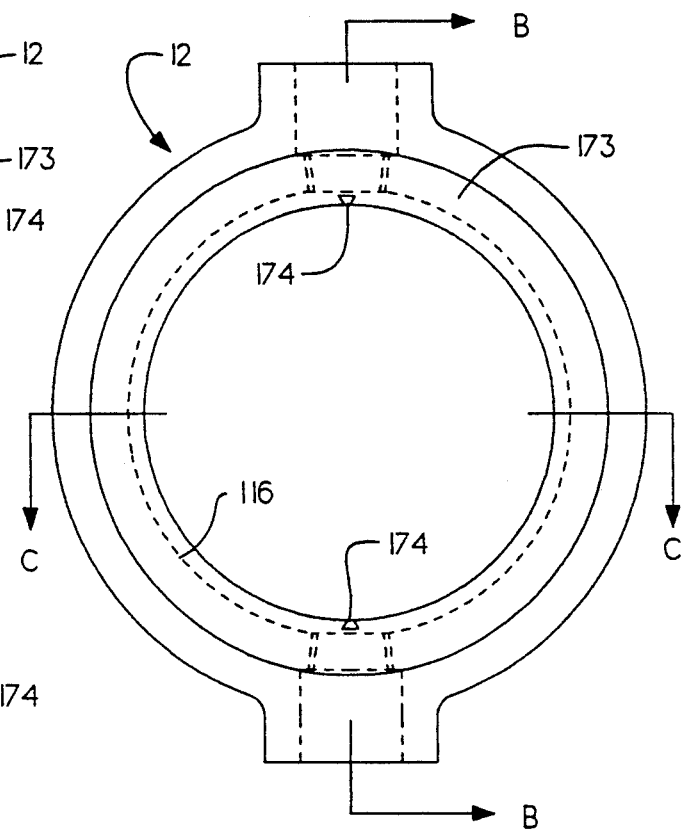
FIG. 4C is a cross-sectional top view of the valve body of FIG. 4A taken along the line CC—CC in FIG. 4A.
Figure 4C:
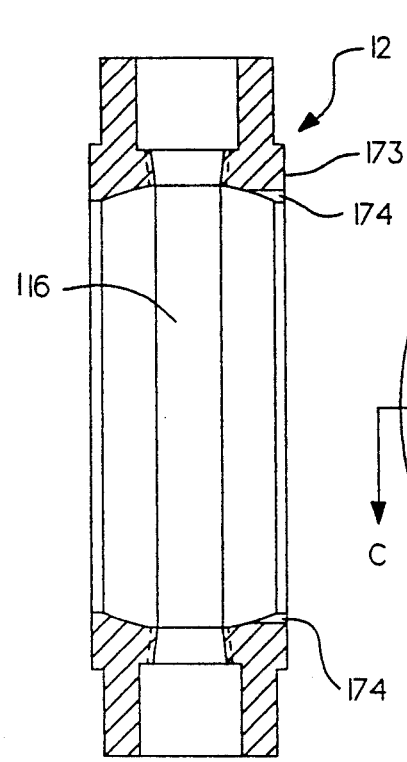
Figure 4C:
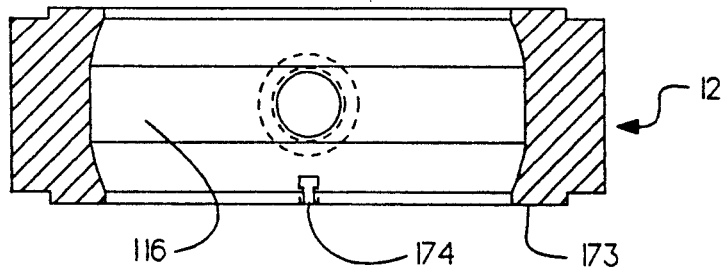
Figure 4D:
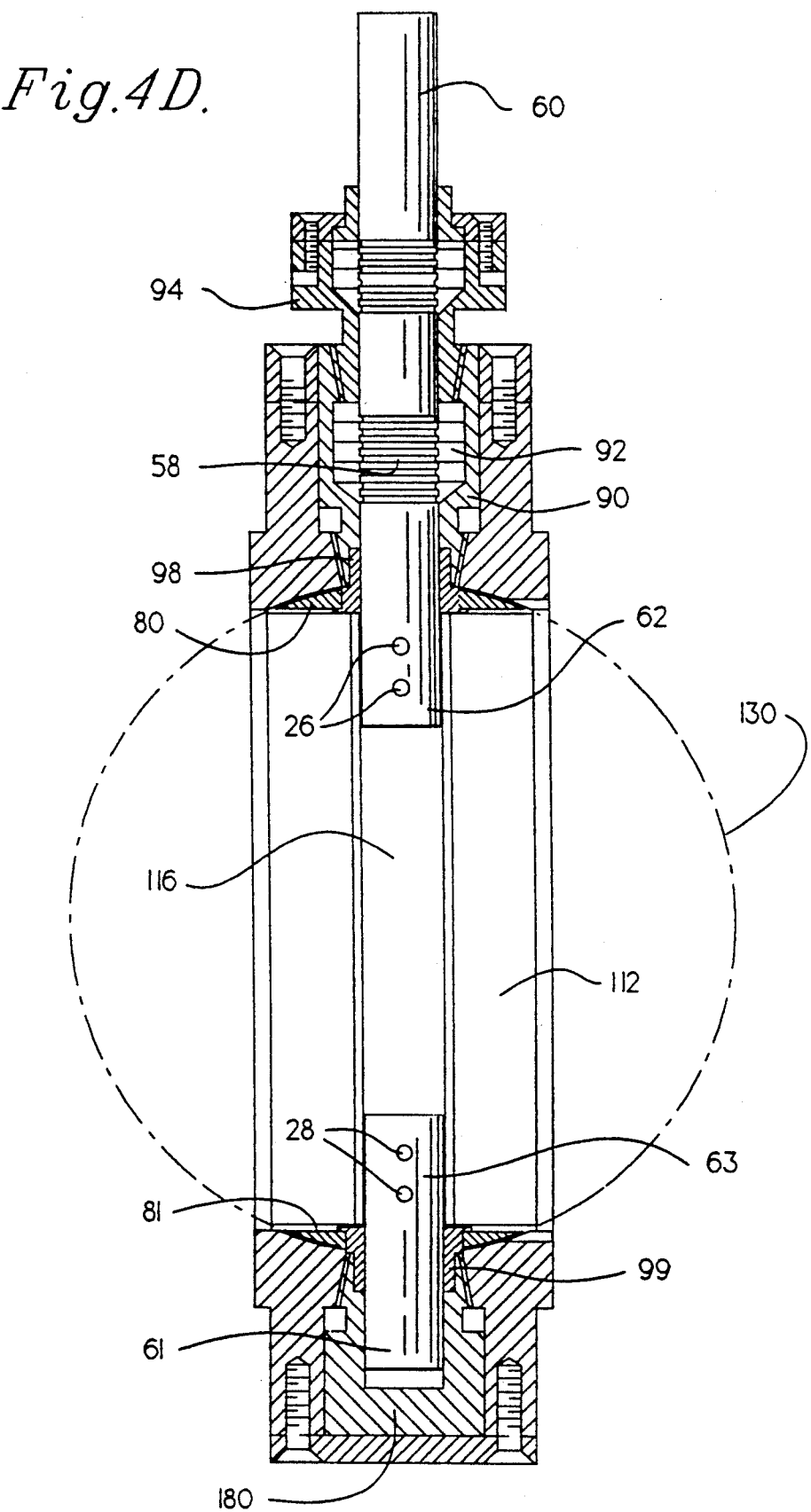
FIG. 4D is a cross-sectional side view of another embodiment of the valve body of the present invention showing the valve disk in phantom.

FIGS. 2A and 2C illustrate one embodiment of the valve body 12. In this embodiment, the valve seat 216 is rigid, cylindrical in construction and constructed of polytetrafluoroethylene impregnated fiberglass. The valve seat 216 is held in place by retaining rings 218. The valve body 12 is adapted to be inserted into a pipeline by conventional means such as bolting the valve body between flanges. As seen in FIGS. 4A and 4C, the valve body 12 has a mounting surface 173 which includes two dovetail grooves 174 designed to receive mating pins 176 (shown in FIGS. 1E and 1F). The mating pins 176 insure that the valve is aligned within the opening in the pipeline. The mating surface can be constructed to include radius grooves 170 for high temperature and pressure application as shown in FIG. 3C or with O-rings 172 and dovetail groove 174 as shown in FIGS. 2C, 4A and 4C. The valve body 12, as depicted in FIGS. 2A and 2C, includes an outer member 23 and an inner member 24 although the valve body can be of unitary construction as shown in FIGS. 1E and 4D. The inner member 24 has a cylindrical centerline valve seat 16 machined therein. Alternatively, the cylindrical centerline valve seat could be a rigid insert into a groove in the valve body. The remainder of the bore of the valve body 12 is the shape of a truncated sphere.

Figure 3A:
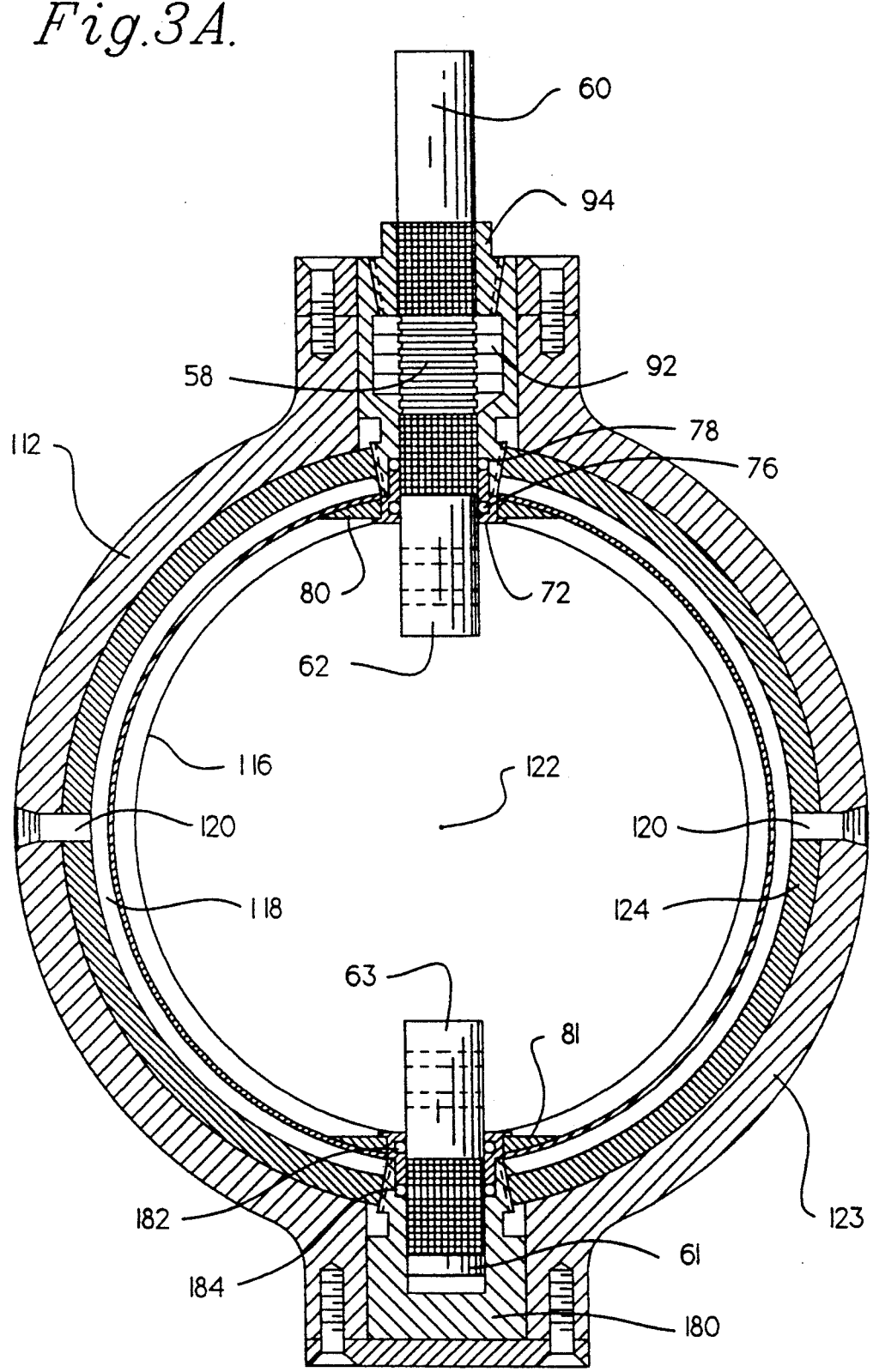
FIG. 3A is a cross-sectional front view of one embodiment of the valve body of the present invention.

In the valve body 112 depicted in FIG. 3A, the valve body 112 includes an outer member 123 and an inner member 124. The valve body 112 includes a cylindrical bore valve seat 116 which is constructed of an elastomeric material such as rubber or polytetrafluoroethylene. On either side of the cylindrical bore valve seat 116 is a spherical bore portion 114. The cylindrical bore valve seat 116 is disposed within a groove 118 which is machined within the valve body 112. The elastomeric valve seat may be biased toward the center 122 of the valve body by insertion of a biasing member (not shown) into the groove 118. Alternatively, if desired, ports 120 may be disposed within the valve body 112 which allow for the introduction of a pressure medium into the groove 118, behind the valve seat 116 to force the valve seat 116 to move toward the valve body center 122, thus allowing for a more effective seal.

Disposed through the valve body, 12 or 112, are two bores, a control shaft bore 54 and a slave shaft bore 56, which are axially aligned with one another. The control shaft bore 54 is adapted for receiving the control shaft 60 therethrough as shown in FIG. 2A. A slave shaft 61 is rotatably disposed through the slave shaft bore 56 in the valve body. A unique attachment assembly, which rotatably attaches the disk to the valve body, will be described hereinbelow.

Figure 5B:
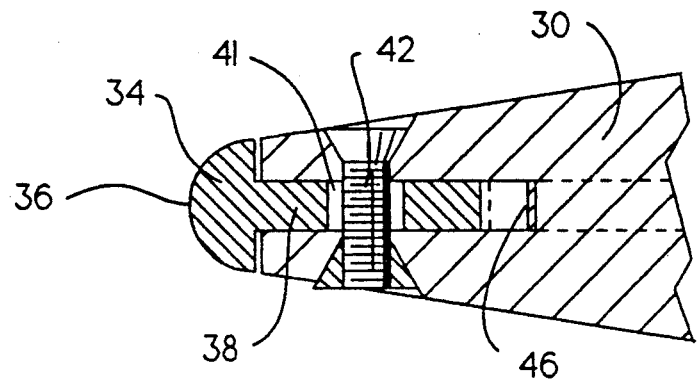
FIG. 5A is a cross-sectional view of one embodiment of the valve disk of the present invention; disk of the present invention.
FIG. 5C is a cross-sectional view of a portion of the valve disk of the present invention.
FIG. 5D is a top view of one embodiment of a valve disk of the present invention.
FIG. 5E is a front view of the valve disk of FIG. 5D.
FIG. 5F is a cross-sectional view of the valve disk of FIG. 5D taken along the line DD—DD.
Figure 5C:
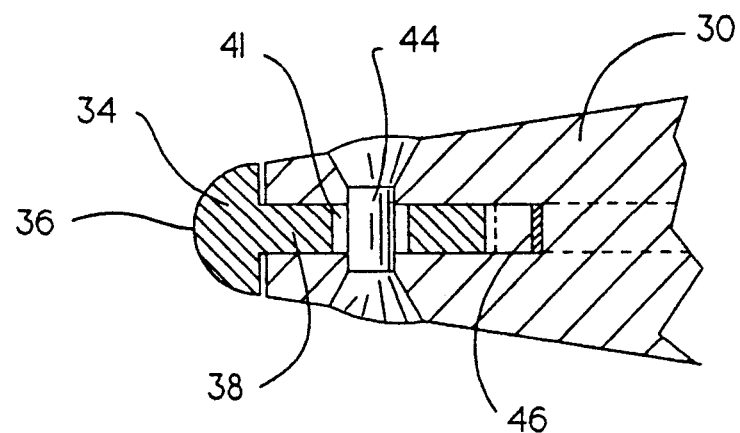
Figure 6B:
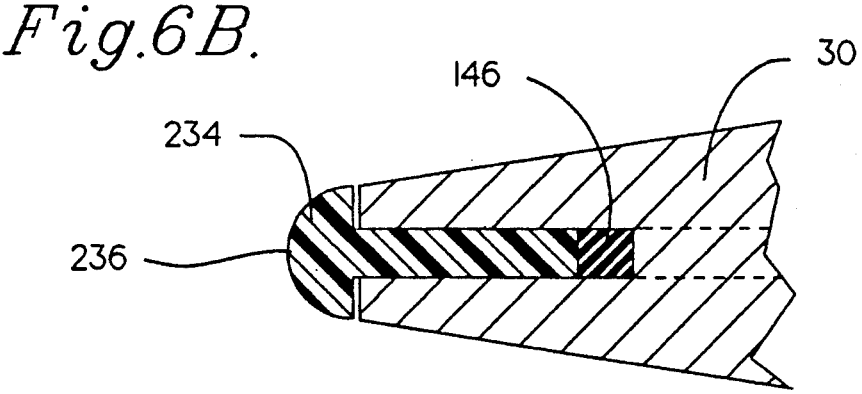
FIG. 6B is a cross-sectional view of a portion of the valve disk of the present invention.
Figure 5D:
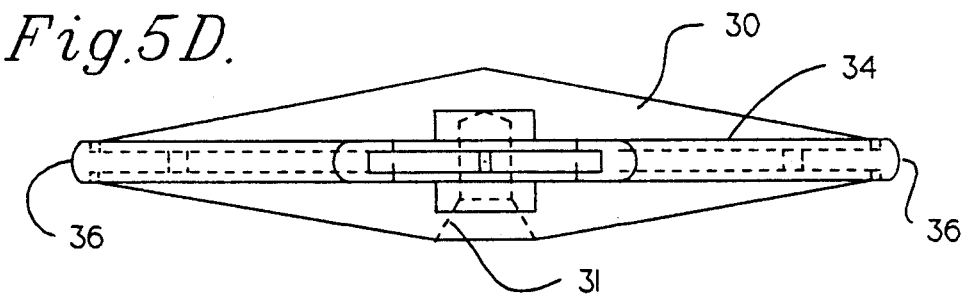
Figure 5E:
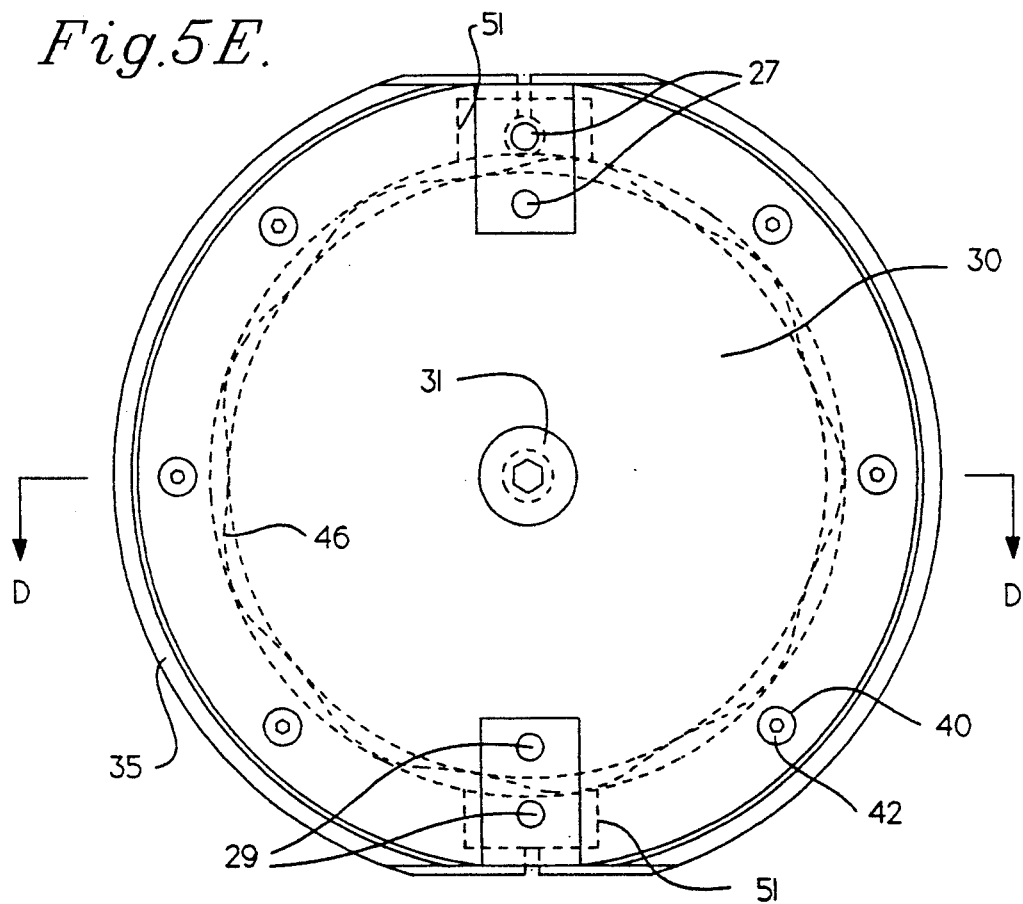
Figure 5F:
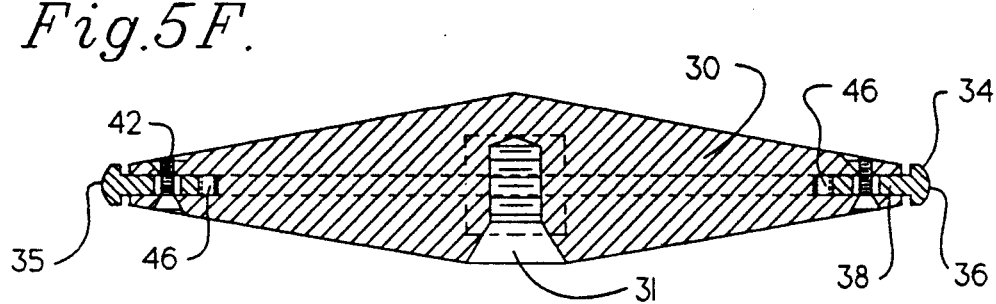
Figure 7B:
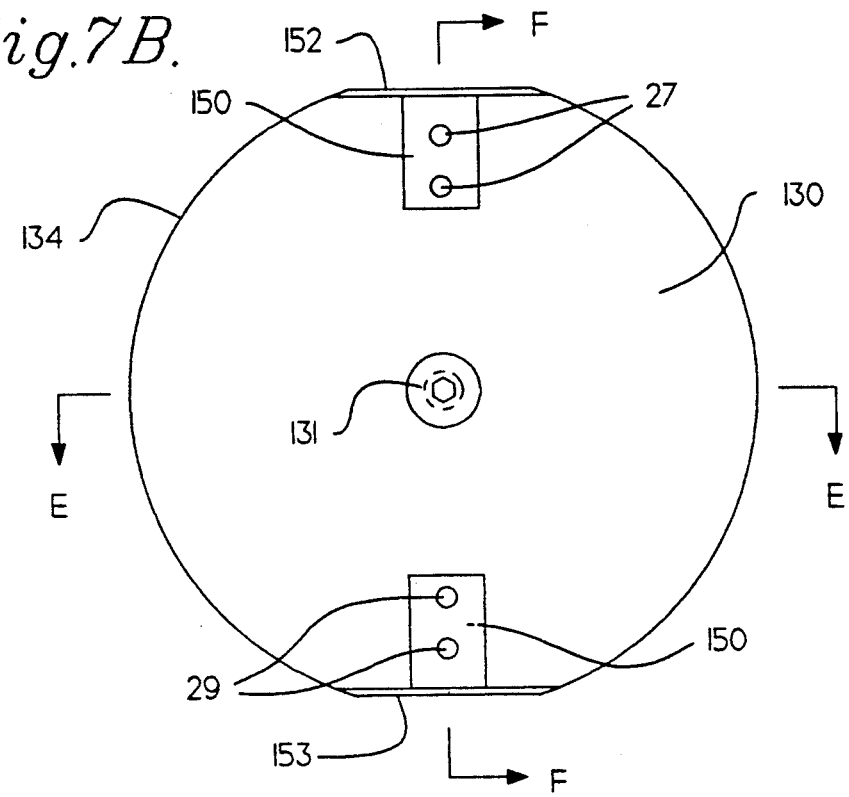
FIG. 7B is a front view of the valve disk of FIG. 7A.
Figure 7A:
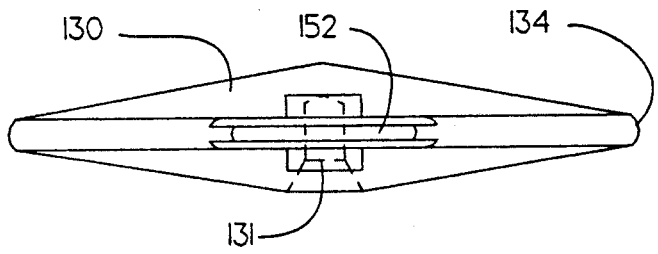
FIG. 7A is a top view of one embodiment of the valve disk of the present invention.
Figure 7C:
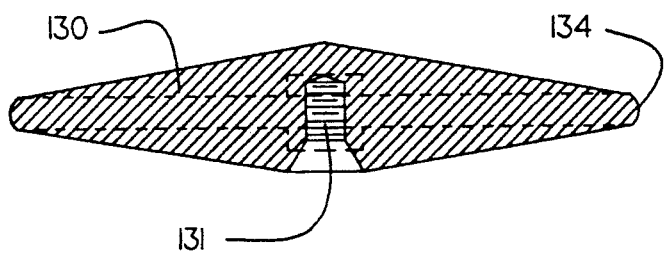
FIG. 7C is a cross-sectional view of the valve disk of FIG. 7B taken along the line EE—EE in FIG. 7B.
Figure 7D:
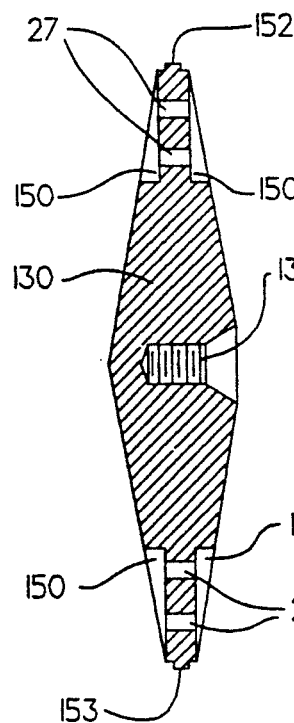
FIG. 7D is a cross-sectional view of the valve disk of FIG. 7B taken along the line FF—FF in FIG. 7C.

FIGS. 5A and 6A illustrate two embodiments of the valve disk. The valve disk 30, as shown in FIGS. 5A and 6A, is designed to be used in conjunction with the valve body depicted in FIGS. 2A and 2C. In FIG. 5A, a valve disk 30 is shown in cross section. As shown in FIGS. 5D, 5E and 5F, the valve disk is shaped as two cones having their bases adjacent one another. The valve disk 30 includes a machining bore 31 to allow the valve disk 30 to be held while being machined. As shown in FIG. 5A, the disk 30 includes tongues 52 and 53, on opposing ends of the disk 30 along two cords of the disk adjacent the perimetrical surface. The disk 30 also includes a seal groove 32 adapted to receive a T-seal 34. T-seal 34 has a sealing portion 36 with a perimetrical surface 35 and a attachment portion 38. The attachment portion 38 has a plurality of holes 41 for attachment to corresponding holes 40 in the valve disk 30. As shown in FIG. 5B, the T-seal 34 may be constructed of metal and attached to the disk 30 by means of screws 42 or, as shown in FIG. 5C, the T-seal 34 may be attached to the disk by means of pins 44 which are welded to the disk 30. As shown in FIG. 6B, the T-seal 234 may be constructed of an elastomeric material and not attached to the disk 30 by any rigid means. Holes 41 in the T-seal 34 are oversized, thus allowing the T-seal 34 to move radially with respect to the disk 30. Behind the attachment portion 38 of the T-seal 34 is disposed a linear expansion member 46 which biases the T-seal 34 in a direction radially outward relative to the disk 30.

Alternatively, as shown in FIG. 6A, the linear expansion member 46 can be replaced with a elastomeric expansion member 146 which also biases the T-seal 34 in a direction away from the disk 30. The disk 30 includes four recesses or coupling pads 50, two pairs at each end of the disk 30 on opposite sides, with two recesses or coupling pads adjacent to each tongue 52 and 53. Between each pair of recesses or coupling pads 50 is a reinforcement plate 51 which strengthens the disk at the location of the recesses or coupling pads 50.

Another embodiment of the valve disk is shown in FIGS. 7A, 7B, 7C and 7D. The disk 130 is solid in construction so that it will not contract and has a convex perimetrical surface 134. The valve disk 130 includes a machining bore 131 to allow the valve disk 130 to be held while being machined. The valve disk 130 includes coupling pads 150 and tongues 152 and 153 similar to coupling pads 50 and tongues 52 and 53 described above. The disk 130, as it is of solid construction, has a constant radius. Accordingly, the disk 130 is intended to be used in conjunction with the valve body 112 as depicted in FIG. 3A and 3C. This valve body 112, as described above, includes an elastomeric valve seat 116, which deforms upon rotation of the valve disk 130 into the closed position and exerts a force radially inward, thus providing for an effective seal.

Figure 3B:
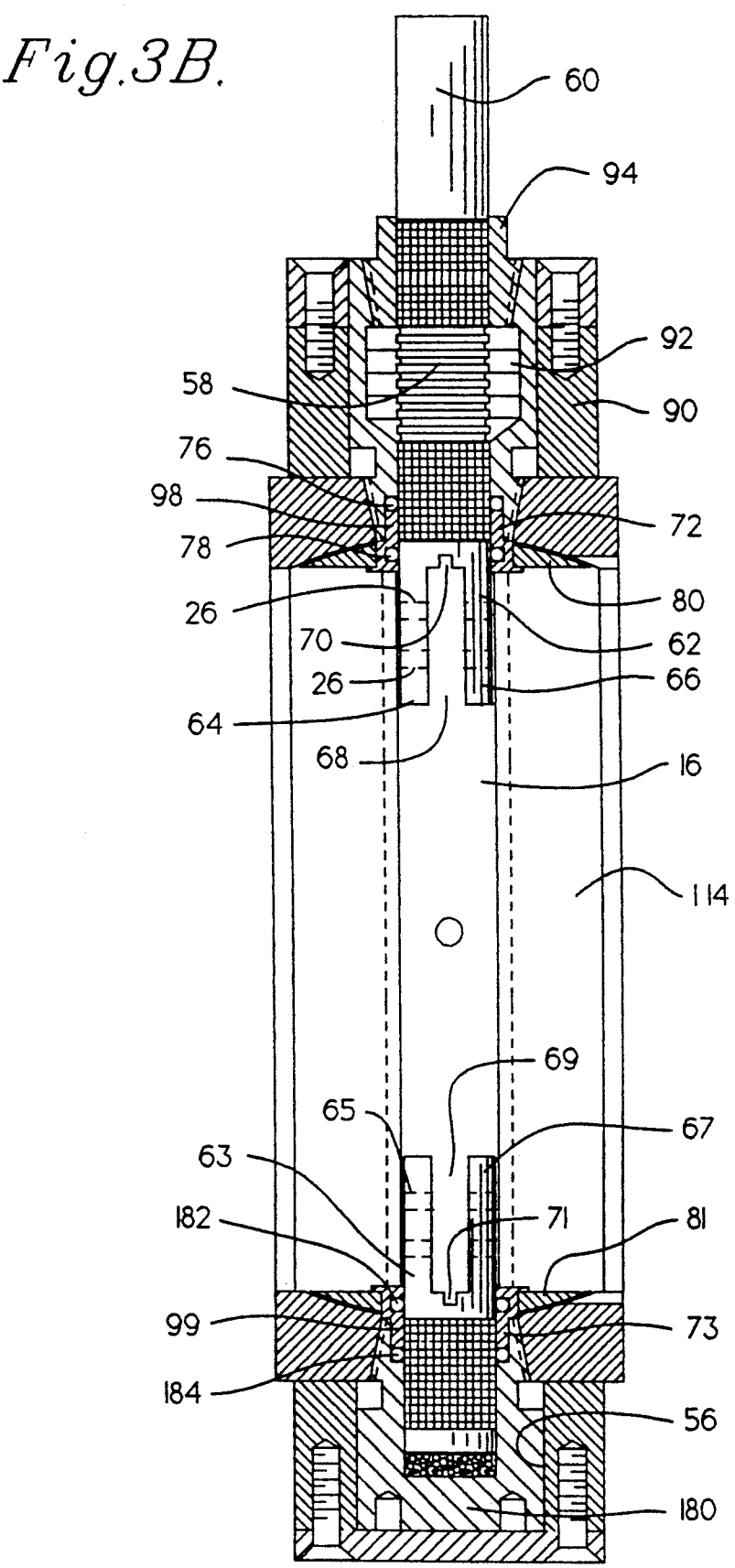
FIG. 3B is a cross-sectional side view of the valve body of FIG. 3A.
Figure 8:
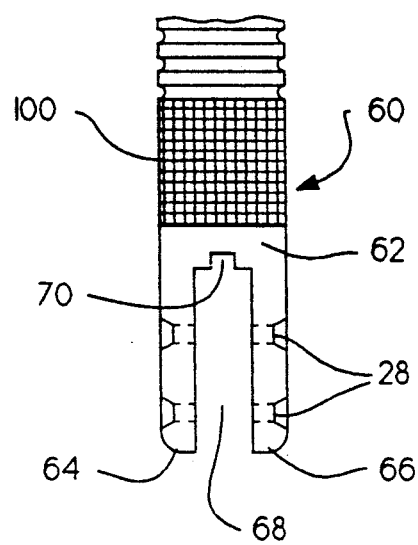
FIG. 8 is a front view of a portion of the control shaft of the present invention.

As shown in FIGS. 3B and 4D, the disk 30 is rotated by a control shaft 60 which is attached to disk 30 by a unique attachment assembly. This attachment assembly will be described in conjunction with the valve disk 30 and valve body 12 for the purpose of simplicity. However, the valve disk 130 and valve body 112 may utilize the same attachment assembly. The shaft 60 has an end 62 which terminates in two legs 64 and 66. The legs 64 and 66 define a U-shaped receiving aperture 68, adapted to receive the coupling pads 50. The legs 64 and 66 include holes 26 for attaching the legs 64 and 66 to the disk by conventional attachment means such as bolts, screws or rivets or by a weld bead. In low pressure applications, it is possible to have no rigid fasteners connecting the disk and shaft. The holes 26 correspond to holes 27 (FIG. 5A) in the valve disk 30 however, the holes 27 are slightly oversized, thus allowing for slight movement of the disk as is discussed hereinbelow. A groove 70 in the shaft 60, as shown in FIG. 8, is adapted to receive the tongue 52. The shaft 60 may include a replaceable bearing area 100 constructed of a material such as polytetrafluoroethylene impregnated fiberglass cloth, graphite, metal spray or bearing bronze sheet.

Figure 10:
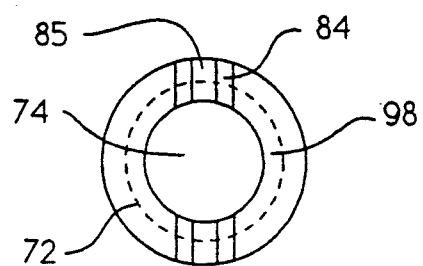
FIG. 10 is a bottom view of the bushing of the present invention as used in conjunction with the control shaft.

A bushing 72, as shown in FIG. 10, is provided with a bore 74 adapted to receive the control shaft 60. The bushing 72 includes an outer groove 84 to receive the perimetrical surface 35 of the valve disk 30 and an inner groove 85 to receive the tongue 52. The bushing 72 includes O-rings 76 and 78 (FIG. 3B) to create a seal between the bushing 72 and the shaft 60. The bushing 72 is rotatably disposed within the shaft bore 54 and includes a bearing flange 98.

Figure 9:
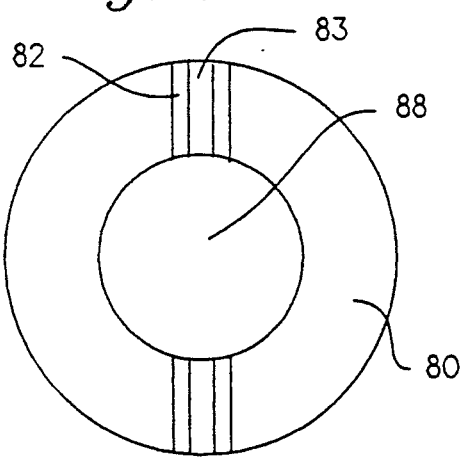
FIG. 9 is a bottom view of the rotating seal of the present invention as used in conjunction with the control shaft.

Surrounding the bushing 72 and adjacent the disk is a circular rotating seal 80, as shown in FIG. 9. Rotating seal 80 is adapted to be rotatably received within the bore 14 of the valve body 12 and abuts against the inside surface 18. The rotating seal 80 includes a bore 88 to receive the bushing 72. The bearing flange 98 s adapted to abut the rotating seal 80. The rotating seal 80 also includes an outer groove 82 for receiving the perimetrical surface 35 of the disk 30 and a inner groove 83 for receiving the tongue 52. The combination of the shaft 60, rotating seal 80 and bushing 72 provide a very strong attachment assembly for attachment of the shaft 60 to the disk 30. The attachment assembly is constructed such that the disk may move slightly in the direction parallel to the groove 82 thus allowing the disk 30 to self-align within the valve body bore 14.

Figure 13:
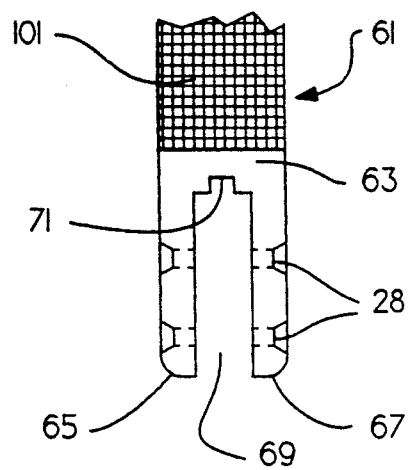
FIG. 13 is a front view of a portion of the slave shaft of the present invention.
Figure 11:
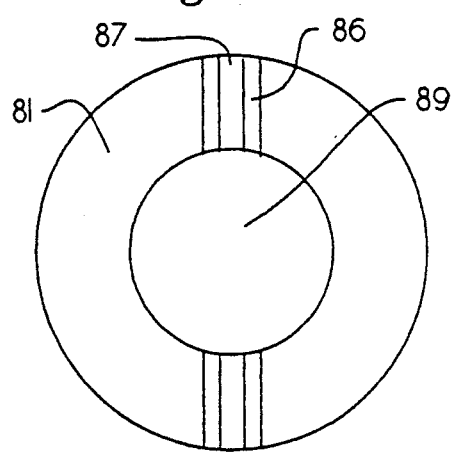
FIG. 11 is a top view of the rotating seal of the present invention as used in conjunction with the slave shaft.
Figure 12:
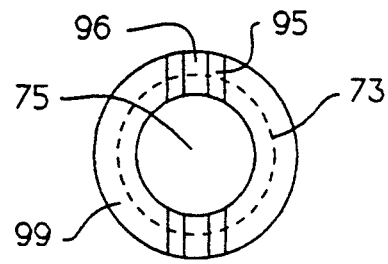
FIG. 12 is a top view of the bushing of the present invention as used in conjunction with the slave shaft.

The slave shaft 61 is attached to the valve disk 30 in a similar manner. The slave shaft 61, as shown in FIG. 13, has an end 63 which terminates in legs 65 and 67. The legs 65 and 67 include holes 28 which correspond to holes 29 in the valve disk 30. The legs 65 and 67 define a receiving aperture 69, adapted to receive the coupling pads 50. The slave shaft 61 also includes a replaceable bearing area 101. A groove 71 in the shaft 61 is adapted to receive the tongue 53. A bushing 73, as shown in FIG. 12, is provided with a bore 75 adapted to receive the slave shaft 61. The bushing 73 includes O-rings 77 and 79 to create a seal between bushing 73 and the slave shaft 61 (FIG. 3B). The bushing 73 is rotatably disposed within the shaft bore 56 and includes a bearing flange 99. The bushing 73 includes an outer groove 95 for receiving the perimetrical surface 35 and an inner groove 96 for receiving the tongue 53. Surrounding the bushing 73 and adjacent the valve disk 30 or 130 is a circular rotating seal 81, as shown in FIG. 11. The rotating seal 81 is adapted to be rotatably received within the bore 14 of the valve body 12 and abuts against the inside surface 18. The rotating seal 81 includes a bore 89 for receiving the bushing 73. The bearing flange 99 is adapted to abut against the rotating seal 81. The rotating seal 81 also includes a groove 86 for receiving the perimetrical surface 35 and a groove 87 for receiving the tongue 53.

In one embodiment as shown in FIG. 3A, a stuffing box 90 is threaded into the valve body 112 and has a bore therein to receive the bushing 72. The threads on the stuffing box 90 and the threads on the valve body 112 may be constructed such that a difference in taper exists to allow for a tighter seal between the two. The stuffing box 90 includes packing rings 92 constructed of a resilient material such as polytetrafluoroethylene cord. The shaft 60 has grooves 58 for receiving the packing rings 92. A packing follower 94 is threadably received in the stuffing box 90. When threaded into the stuffing box 90, the packing follower 94 presses downward onto the packing rings 92 thus forcing them into the grooves 58 on the shaft 60. If desired, a second stuffing box (not shown) can replace the packing follower 94 to provide additional sealing between the valve body bore and atmosphere. When a second stuffing box is used, the packing follower 94 is used to force the packing rings of the second stuffing box into the grooves (not shown) of the shaft.

Alternatively, a sealing bushing 190 can be slidably inserted into valve body as shown in FIGS. 2A and 2B. With sealing bushing 190, O-rings 175, 177, 179 and 192 seal the valve body bore 14 from atmosphere.

As shown in FIG. 3A, the stuffing box adjacent the slave shaft can be replaced with a sealing bushing 180 which is threadably attached to the valve body 112. The sealing bushing 180 includes an O-rings 182 and 184, which surround the shaft bore 54 and seals the valve body 112 from atmosphere. O-rings 182 and 184 prevent the pressure medium from escaping from the valve body 12 along the shaft 61.

As shown in FIG. 2B, a sealing bushing 280 may be slidably inserted within the slave shaft bore 56 and includes O-rings 282, 284, 286 and 288 to seal the slave shaft bore 56.

In operation, the shaft 60 is rotated by an actuator such as, for example, the actuator described in my pending patent application, U.S. application Ser. No. 692,328 filed Apr. 26, 1991, the disclosure of which is hereby incorporated by reference. The shaft 60, bushing 72, and rotating seal 80 rotate in unison and being connected to the disk 30, cause the disk to rotate. The disk 30 can be rotated into any position between fully open and fully closed as illustrated in FIGS. 1D, 1E and 1F. The pressure medium flowing through the bore 14 in the valve body 12 is prevented from escaping from the valve body to atmosphere by the effective sealing characteristics of the attachment assembly and the stuffing box.

It will be understood that various changes in the details, materials and arrangements of parts which have been herein described and illustrated in order to explain the nature of the invention, may be made by those skilled in the art within the principle and scope of the invention as expressed in the appended claims.

I claim:

1. A valve apparatus for controlling flow through a pipeline comprising:
   a valve body constructed for insertion into said pipeline and having a control shaft bore, a slave shaft bore and a valve bore having a central plane which is perpendicular to the axis of the pipeline, said valve bore comprising a spherical valve surface which is truncated by two planes which are parallel to and on opposite sides of said central plane, said valve surface also including a valve seat which comprises a cylindrical surface intersecting said central plane and said spherical surface;
   a control shaft rotatably mounted through said control shaft bore;
   a slave shaft rotatably mounted through said slave shaft bore;
   a valve member comprising a disk which is operably mounted within said valve bore between said slave shaft and said control shaft for rotation by said control shaft between an open and a closed position relative to said valve seat.

2. The apparatus of claim 1 wherein said valve member includes opposing surfaces constructed as two cones integral to one another, said cones having their bases adjacent one another and a perimetrical surface substantially perpendicular to said bases.

3. The apparatus of claim 2 further comprising an attachment assembly for attaching said valve member to said control shaft comprising:
   a tongue member formed along a portion of said perimetrical surface of said valve member;
   a pair of recesses formed in said opposing surfaces of said disk shaped valve member and adjacent said tongue member;
   a pair of leg members, integral to said control shaft, said leg members defining an aperture, said aperture adapted to receive said recesses, said control shaft further having a groove constructed to receive said tongue;
   a bushing adapted to be received by said control shaft bore, said bushing having a bore therethrough adapted to receive said control shaft, a groove adapted to receive said perimetrical surface of said valve member and an inner groove within said outer grove adapted to receive said tongue; and
   a circular rotating seal having a bore therethrough adapted to receive said bushing, an outer groove for receiving said perimetrical surface and an inner groove adapted to receive said tongue, said rotating seal constructed to abut said inside surface of said valve body about said control shaft bore.

4. The apparatus of claim 3 further including sealing means for sealing said valve bore from the atmosphere.

5. The apparatus of claim 4 wherein said sealing means comprises:
   a stuffing box having bore therethrough adapted to receive said bushing at one end, said bore having threads at the other end;
   packing rings adapted to be received by said bore in said stuffing box;
   said control shaft further including grooves therein for receiving said packing rings; and
   a packing follower threadably attached to said other end of said bore in said stuffing box such that said packing follower may exert a force on said packing rings to cause said packing rings to enter said grooves in said control shaft.

6. The apparatus of claim 1 wherein said valve seat is rigid.

7. The apparatus of claim 1 wherein said valve seat comprises a circumferential groove in said valve body and an elastomeric material disposed within said groove.

8. The apparatus of claim 1 further comprising a port in the opposite side of said valve body from said valve surface and adapted to supply a pressure medium to said groove in said valve body such that said pressure medium can exert a force on said elastomeric material to bias said valve seat in a direction toward the center point of said valve bore.

9. A valve apparatus constructed for insertion into a pipeline comprising a valve body having a control shaft bore, a slave shaft bore and a valve bore, said valve bore having a center plane which is perpendicular to the axis of the pipeline, said valve bore comprising a spherical valve surface which is truncated by two planes which are parallel to and on opposite sides of said center plane, said valve surface also including a valve seat which comprises a cylindrical surface intersecting said central plane and said spherical surface.

* * * * *

UNITED STATES PATENT AND TRADEMARK OFFICE
CERTIFICATE OF CORRECTION

PATENT NO. : 5,160,118
DATED : November 3, 1992
INVENTOR(S) : Gary M. Stary

It is certified that error appears in the above-identified patent and that said Letters Patent is hereby corrected as shown below:

Title page, item [57]:
   In the Abstract, Col. 2, line 6, delete "metrial" and substitute therefor --metrical--.

Col. 4, line 58, delete "previous" and substitute therefor --previously--.

Col. 6, line 16, delete "industries" and substitute therefor --industry's--.

Col. 6, line 17, delete "provide" and substitute therefor --provides--.

Col. 7, line   , add "FIG. 5B is a cross-sectional view of a portion of the valve;"

Col. 11, line 14, delete "an".

Col. 11, line 18, delete "12" and substitute therefor --112--.

Col. 12, line 32, add "a" before "bore".

UNITED STATES PATENT AND TRADEMARK OFFICE
CERTIFICATE OF CORRECTION

PATENT NO. : 5,160,118

DATED : November 3, 1992

INVENTOR(S) : Gary M. Stary

It is certified that error appears in the above-indentified patent and that said Letters Patent is hereby corrected as shown below:

Col. 12, line 50, delete "1" and substitute therefor --7--.

Signed and Sealed this

Twenty-second Day of February, 1994

Attest:

BRUCE LEHMAN

Attesting Officer     Commissioner of Patents and Trademarks